(12) United States Patent
Wehner et al.

(10) Patent No.: US 7,063,421 B2
(45) Date of Patent: Jun. 20, 2006

(54) SPECTACLE LENS WITH SMALL HIGHER ORDER ABERRATIONS

(75) Inventors: Edda Wehner, Emmering (DE); Andrea Welk, Munich (DE); Walter Haimerl, Munich (DE); Helmut Altheimer, Baisweil-Lauchdorf (DE); Gregor Esser, Munich (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 11/113,122

(22) Filed: Apr. 25, 2005

(65) Prior Publication Data

US 2005/0206842 A1    Sep. 22, 2005

Related U.S. Application Data

(63) Continuation of application No. PCT/EP03/11859, filed on Oct. 24, 2003.

(30) Foreign Application Priority Data

Oct. 25, 2002   (DE) ............................... 102 50 093

(51) Int. Cl.
*G02C 7/02*   (2006.01)
*G02C 7/06*   (2006.01)

(52) U.S. Cl. ...................................... 351/159; 351/169
(58) Field of Classification Search ................ 351/159, 351/169
See application file for complete search history.

(56) References Cited

U.S. PATENT DOCUMENTS

| | | | | |
|---|---|---|---|---|
| 5,220,359 A | * | 6/1993 | Roffman ..................... 351/177 |
| 5,835,186 A | * | 11/1998 | Copeland et al. ........... 351/159 |
| 6,145,987 A | * | 11/2000 | Baude et al. ................ 351/169 |
| 6,183,084 B1 | | 2/2001 | Chipman et al. |
| 6,231,182 B1 | | 5/2001 | Guilino et al. |
| 2002/0008846 A1 | * | 1/2002 | Kelch et al. ................. 351/169 |
| 2002/0176049 A1 | * | 11/2002 | Sakai et al. ................. 351/177 |
| 2003/0081171 A1 | * | 5/2003 | Griffin ........................ 351/161 |
| 2005/0083481 A1 | * | 4/2005 | Dreher ....................... 351/168 |

FOREIGN PATENT DOCUMENTS

EP        969 309        1/2000

* cited by examiner

*Primary Examiner*—Jordan M. Schwartz
(74) *Attorney, Agent, or Firm*—Crowell & Moring LLP

(57) ABSTRACT

A unifocal spectacle lens with an aspheric and/or atoric surface, or a progressive spectacle lens, in which the unifocal spectacle lens or the progressive spectacle lens has small higher order aberrations.

7 Claims, 17 Drawing Sheets r [mm], z [mm]
0.0000, 0.0000
1.0000, 0.0020
2.0000, 0.0079
3.0000, 0.0177
4.0000, 0.0314
5.0000, 0.0492
6.0000, 0.0709
7.0000, 0.0966
8.0000, 0.1263
9.0000, 0.1601
10.0000, 0.1980
11.0000, 0.2401
12.0000, 0.2863
13.0000, 0.3367
14.0000, 0.3914
15.0000, 0.4503
16.0000, 0.5136
17.0000, 0.5813
18.0000, 0.6533
19.0000, 0.7299
20.0000, 0.8109
21.0000, 0.8965
22.0000, 0.9867
23.0000, 1.0814
24.0000, 1.1808
25.0000, 1.2849
26.0000, 1.3937
27.0000, 1.5072
28.0000, 1.6255
29.0000, 1.7485
30.0000, 1.8764

SPECTACLE LENS WITH SMALL HIGHER ORDER ABERRATIONS

CROSS REFERENCE TO RELATED APPLICATIONS

This application is a continuation of international patent application no. PCT/EP2003/011859, filed Oct. 24, 2003, designating the United States of America and published in German as WO 2004/038488 A1 on May 6, 2004, the entire disclosure of which is incorporated herein by reference. Priority is claimed based on Federal Republic of Germany patent application no. DE 102 50 093.2, filed Oct. 25, 2002.

BACKGROUND OF THE INVENTION

The present invention relates to a spectacle lens with small higher order aberrations.

Aspheric or atoric surfaces have been in use for quite some time in unifocal lenses. The aim in this case is to improve either the cosmetic properties or the optical properties. Cosmetic properties are understood as thickness, weight and bending, and optical properties are understood as astigmatism and the dioptric power. In general, the aim in the case of unifocal lenses with aspheric or atoric surfaces is to improve the cosmetic properties without worsening the optical properties. Higher order aberrations have not so far been taken into account. However, compatibility problems frequently occur in the case of unifocal lenses with spherical or atoric surfaces. Understanding these problems was not possible, because the second order aberrations (astigmatism and dioptric power) were very effectively corrected. The reason for these problems resided in the higher order aberrations, which were not taken into account in the prior art and which assume considerably higher values than in the case of unifocal lenses with spherical or toric surfaces (meniscus-shaped lenses).

In progressive lenses, the higher order aberrations play a very substantial role, since such aberrations are induced there because of the progression. Nevertheless, these aberrations have not so far been taken into account in the prior art.

It may therefore be stated that in the case of spectacle lenses from the prior art no account has yet been taken of higher order aberrations, principally spherical aberration and coma.

SUMMARY OF THE INVENTION

It is therefore an object of the invention to provide an improved spectacle lens with aspheric and/or atoric surfaces.

A further object of the invention is to provide an improved progressive lens.

Another object of the invention is to provide a spectacle lens in which the aforementioned compatibility problems do not arise.

These and other objects are achieved in accordance with a first aspect of the present invention by providing a unifocal spectacle lens having an aspheric or atoric surface, wherein the lens exhibits small higher order aberrations.

In accordance with a further aspect of the invention, the objects are achieved by providing a progressive spectacle lens having small higher order aberrations.

Thus, a unifocal spectacle lens with aspheric and/or atoric surface, and a progressive spectacle lens are provided that are defined by having small higher order aberrations. As used herein, the term "higher order aberrations" is understood to mean a spherical aberration and/or a coma. In the case of unifocal spectacle lenses, it is assumed, furthermore, that the higher order aberrations correspond to those of a unifocal spectacle lens with spherical and/or toric surfaces. Furthermore, both the astigmatism and the dioptric power as well as the coma and the spherical aberration are comparable to those of a meniscus-shaped lens. In the case of progressive spectacle lenses, the maximum value of the coma is located in a rectangle that is defined by the centering point, the prism reference point and the near reference point. Furthermore, the quotient of coma and addition is bounded. The coma increases only slightly, in particular at the reference points, with the increase in pupil diameter. Furthermore, as a function of the pupil diameter, the coma has a smaller gradient at the reference points than at the points of maximum coma. Both the maximum value and the minimum value of the spherical aberration are located in a rectangle that is defined by the centering point, the prism reference point and the near reference point. Moreover, the spherical aberration increases only slightly, in particular at the reference points, with the increase in pupil diameter. Again, as a function of the pupil diameter, the spherical aberration has a smaller gradient at the reference points than at the points with maximum and minimum values.

By way of example, in the case of spherical unifocal lenses the bending is selected such that the second order aberrations, the astigmatism of inclined pencils and refractive aberrations are corrected as well as possible. For this reason, unifocal lenses with spherical surfaces are designed as meniscus-shaped lenses. In this case, the bending is selected such that the astigmatism of inclined pencils and the refractive aberrations are as small as possible. However, bi-lenses (radius ratio approximately 1:6) and not meniscus-shaped lenses should be used in order to correct the aperture error (spherical aberration). As a rule, however, no compatibility problems arise with meniscus-shaped lenses. The reason for this is apparently that the aperture stop of the eye is relatively small, and that in addition the Stiles-Crawford effect superimposes a smaller sensory stop on the physical stop. It may be assumed for this reason that coma and spherical aberration do not cause any compatibility problems at the order of magnitude with which they occur with meniscus-shaped lenses.

The higher order aberrations can be calculated, for example, using the following methods:

1. A direction of view, an object point, a point on the front surface or a point on the rear surface of the spectacle lens are stipulated. The beam path is uniquely defined by one of these four stipulations together with the center of rotation of the eye, and the principal ray can be calculated by ray tracing.
2. The position of the aperture stop is calculated by allowing the entrance pupil of the eye to rotate about the center of rotation of the eye depending on the direction of view. The middle of the aperture stop then lies upon the principal ray. This results in a new position of the aperture stop for each direction of view.
3. The aperture beam path is calculated by calculating beams with different aperture angles from a given object point lying on the principal ray.
4. The wave front in the entrance pupil is then calculated from these beams and the optical path lengths.
5. This wave front is then represented by means of Zernike functions.
6. The aberrations can now be calculated from the coefficient of the Zernike function.

Thus, astigmatism, dioptric power, coma and spherical aberration, inter alia, are obtained for each direction of view.

BRIEF DESCRIPTION OF THE DRAWINGS

The invention is described in further detail below by way of example with reference to illustrative embodiments shown in the accompanying drawing figures without restricting scope of the invention. All details of the drawing figures are hereby incorporated into this specification. In the drawings:

FIG. 5 shows a table of the sagitta of an aspheric surface according to the invention, as a function of the distance r from the vertex;

DETAILED DESCRIPTION OF EMBODIMENTS

Figure 1:
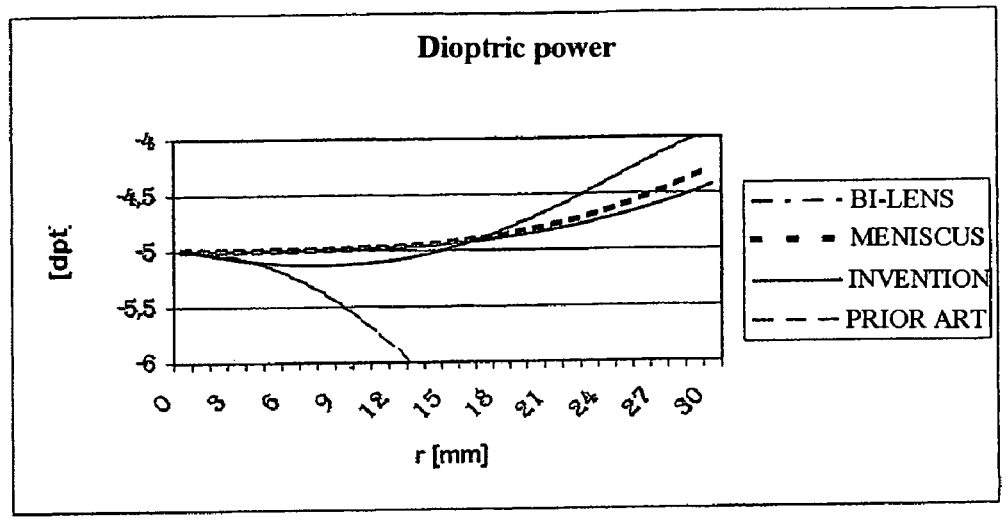
FIG. 1 shows the variation in the dioptric power as a function of the distance r from the vertex.

The downwardly running dashed and dotted line in FIG. 1 illustrates the course in the case of a bi-lens. The dotted line running above that illustrates the course in the case of a meniscus-shaped lens. The continuous line illustrates the course in the case of an aspheric lens according to the invention. Finally, the fourth, dashed line illustrates the course in the case of an aspheric lens according to the prior art. It is to be seen that the meniscus-shaped lens and the two aspheric lenses have very good properties, and exhibit small deviations from the prescribed values, at least as far as approximately 20 mm. By contrast, the bi-lens has very poor properties.

Figure 2:
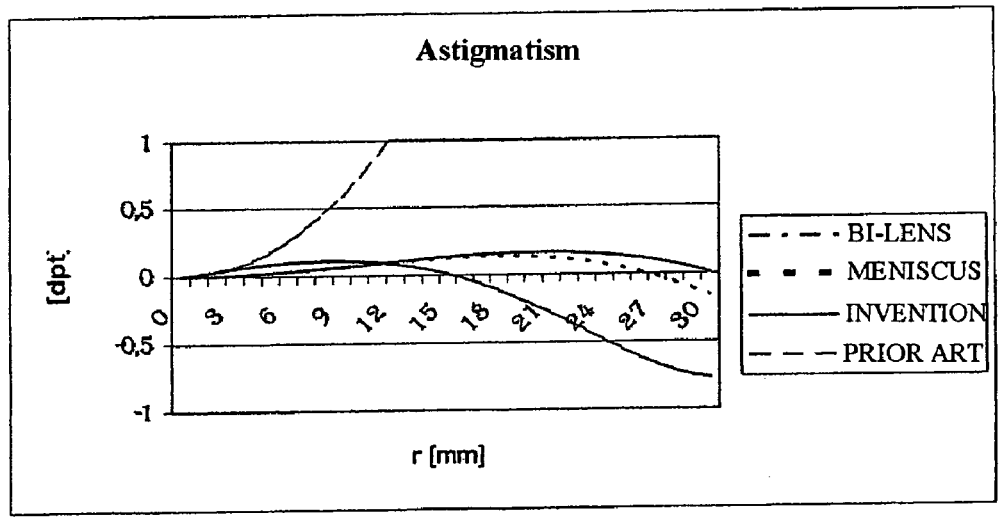
FIG. 2 shows the astigmatism as a function of the distance r from the vertex.

The dashed and dotted line in FIG. 2 illustrates the course in the case of a bi-lens. The dotted line illustrates the course in the case of a meniscus-shaped lens. The continuous line illustrates the course in the case of an aspheric lens according to the invention, and the dashed line illustrates the course in the case of an aspheric lens according to the prior art. It may be seen that the meniscus-shaped lens and the aspheric lens according to the invention have very good properties. The prior art exhibits slightly poorer properties. By contrast, the bi-lens has very poor properties.

Figure 3:
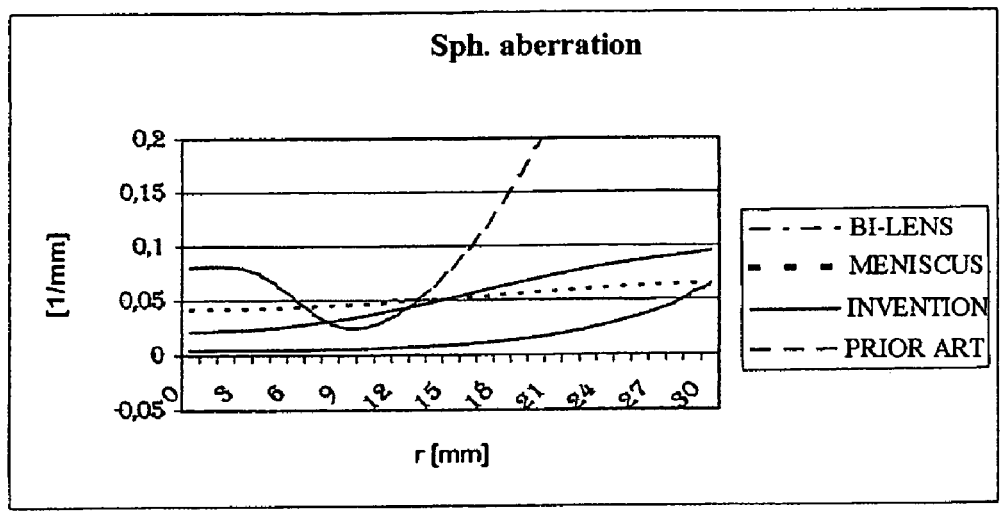
FIG. 3 shows the spherical aberration as a function of the distance r from the vertex.

The dashed and dotted line in FIG. 3 illustrates the course for a bi-lens. The dotted line illustrates the course in the case of a meniscus-shaped lens, the continuous line illustrates the course in the case of an aspheric lens according to the invention, and the dashed line illustrates the course in the case of an aspheric lens according to the prior art. A quite different picture is seen in the case of higher order imaging properties. As expected, the bi-lens exhibits very small spherical aberration. By contrast, the prior art exhibits a very high spherical aberration. The aspheric spectacle lens according to the invention exhibits a small aberration of the order of magnitude of the meniscus-shaped lens.

Figure 4:
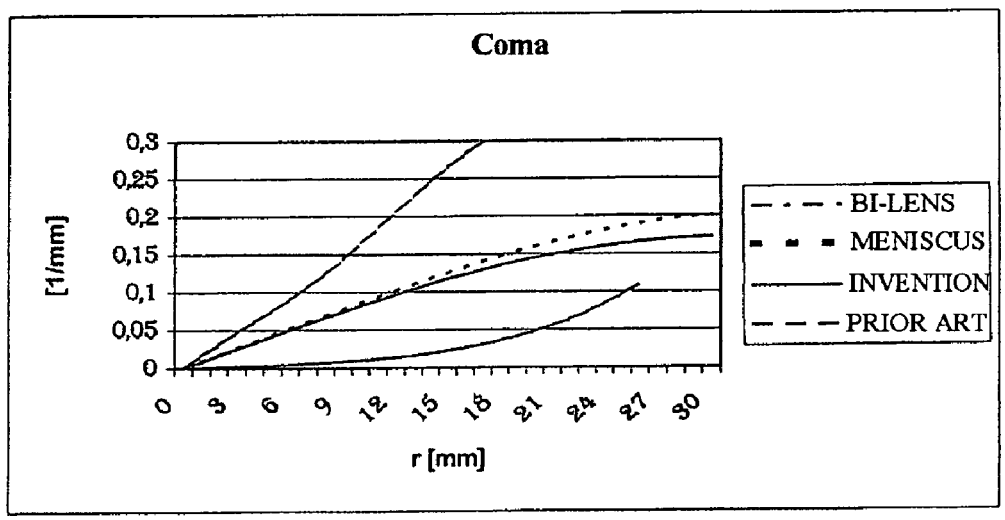
FIG. 4 shows the coma as a function of the distance r from the vertex.

The dashed and dotted line in FIG. 4 illustrates the course in the case of a bi-lens. The dotted line illustrates the course in the case of a meniscus-shaped lens. The continuous line illustrates the course in an aspheric lens according to the invention, and the dashed line illustrates the course in the case of an aspheric lens according to the prior art. As may be seen, the bi-lens exhibits a very small aberration here, as well. By contrast, the prior art exhibits a very high aberration. The aspheric spectacle lens according to the invention exhibits a small aberration of the order of magnitude of the meniscus-shaped lens.

Figure 6:
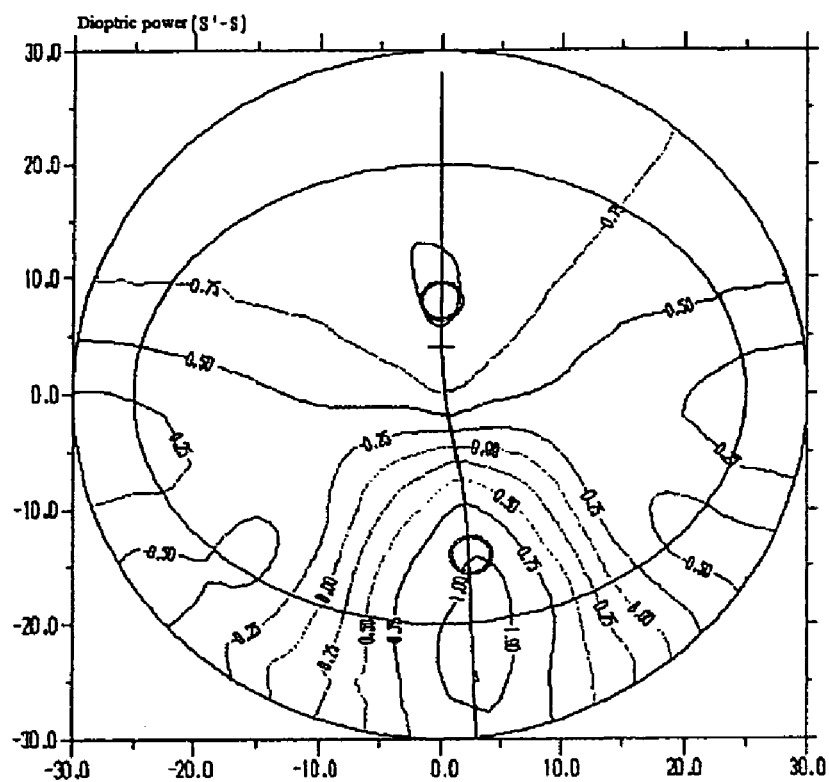
FIGS. 6 to 8 show the dioptric power, the astigmatism and the sagittas of a progressive lens according to the invention.
Figure 7:
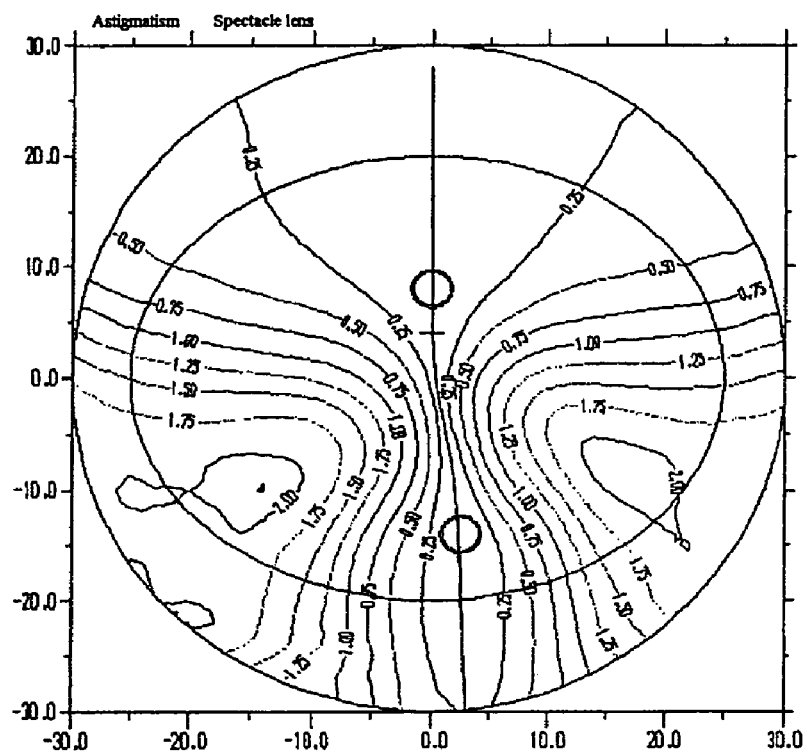
Figure 8:
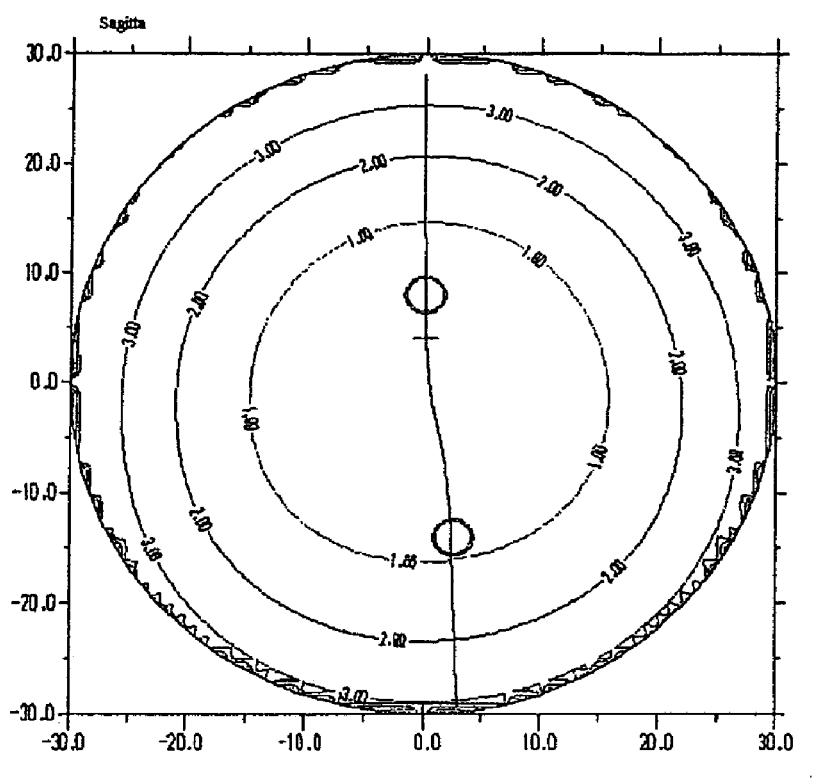

The spectacle lens has the values sph −1.0 add 2.0 n=1.596 in the case of FIGS. 6 to 8. The sagitta is illustrated in Cartesian coordinates for each direction of view in FIG. 8. In the case of a spectacle lens according to the invention, the maximum value is located in a rectangle that is bounded vertically by the centering point (top) and the near reference point (bottom) and horizontally by the vertical straight line that goes through the centering point and distance reference point, and on the other side by the vertical straight line that goes through the near reference point. Since the progression induces coma in the case of a progressive lens, the aim was to design a progressive lens in which the maximum value is that which is induced by the very increase in the dioptric power, otherwise the value should be smaller overall. The aim thereby is thus to permit only the coma that is required because of the progressive action, otherwise the aim is to reduce it overall.

Figure 15:
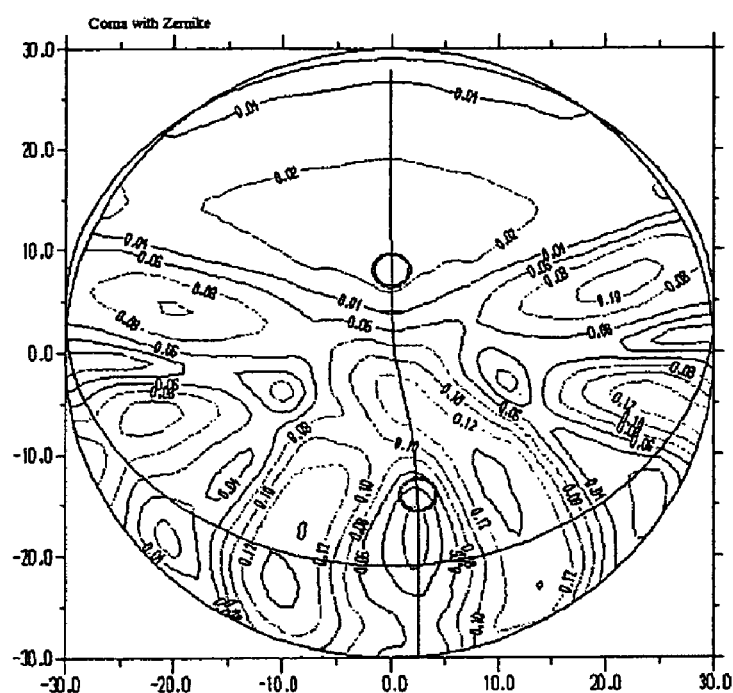
FIGS. 15 and 16 show the coma and the spherical aberration of this prior art progressive lens.

As may be seen from FIG. 15, precisely this is not the case in the prior art. There, the maximum values are outside the progression zone and also very much higher than in the case of the invention. A maximum value of 0.16 is reached at approximately x=10 and y=−10, while the greatest value in the progression channel is only 0.13 and corresponds there to that of a lens according to the invention. Again, in the nasal and temporal outer regions and in the vicinity the values are substantially higher than in the case of the invention. It is therefore an aim of the invention to calculate progressive lenses for which the coma is substantially reduced. In particular, it is advantageous when, as already mentioned, the maximum value of the coma is located in the progression zone, more precisely in a rectangle that is defined by the centering point, the prism reference point and the near reference point. Since the coma is produced in the case of the invention by the progression (addition), it is advantageous that the quotient of coma and addition is bounded.

|  | Addition | | |
| --- | --- | --- | --- |
|  | 1 | 2 | 3 |
| Maximal coma | 0.08 | 0.14 | 0.18 |

The coma increases with the increase in pupil diameter. However, it is preferred when this is bounded, in particular in the case of progressive lenses with a short progression.

Figure 12:
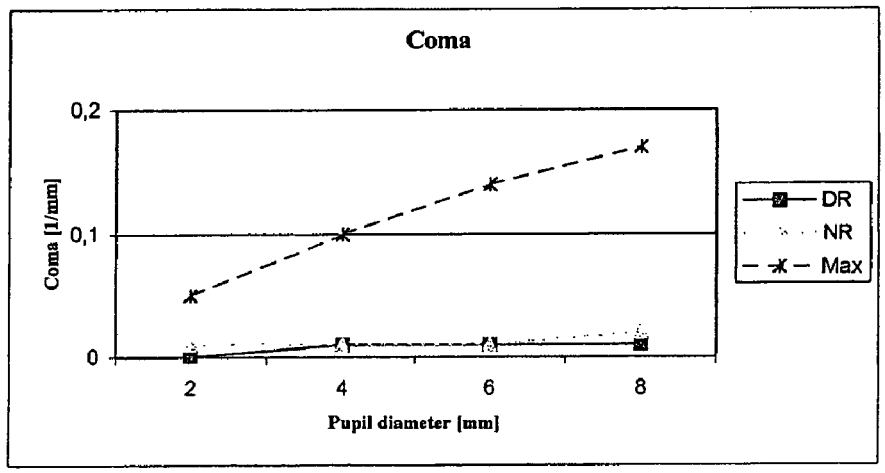
FIG. 12 shows the variations in the coma as a function of the pupil diameter.

FIG. 12 illustrates the variation in the coma as a function of pupil diameter. The dashed line with crosses illustrates the variation in the maximum value. The continuous line with squares illustrates the variation in the distance reference point. The dotted line with triangles illustrates the variation in the near reference point. It can be seen that the gradient (in terms of absolute value) is much smaller at the reference points than at the maximum value. In particular, the coma is very small at the reference points and rises with the increase in pupillary aperture.

Figure 9:
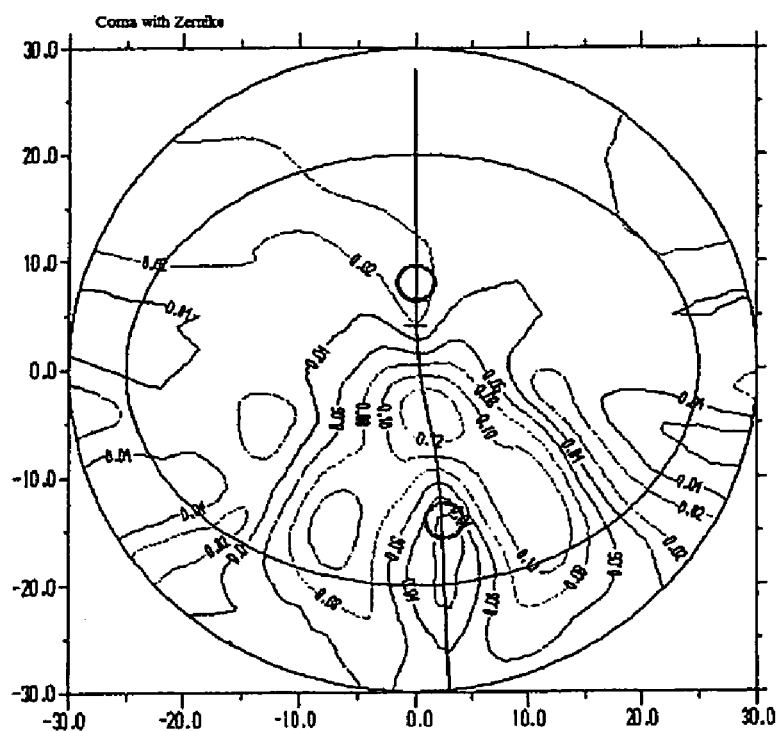
FIG. 9 shows the spherical aberration.

The spherical aberration is illustrated in FIG. 9. Here, in turn, the aim is also to permit only as much spherical aberration as is induced by the progressive lens itself. This means that both the maximum value and the minimum value are located in the progression zone, that is to say in the rectangle described above. It can also be seen in FIG. 9 that the distance area exhibits virtually no spherical aberration. What is first encountered along the principal line of view is (at the start of the progression zone) a positive spherical aberration owing to the increase in the dioptric power, and then a negative aberration at the end of the progression zone.

Figure 16:
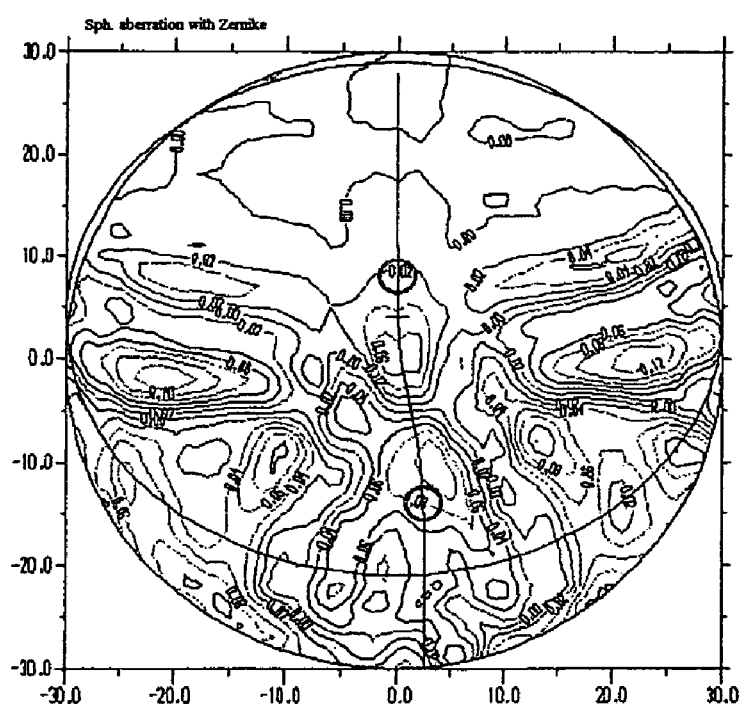
Figure 17:
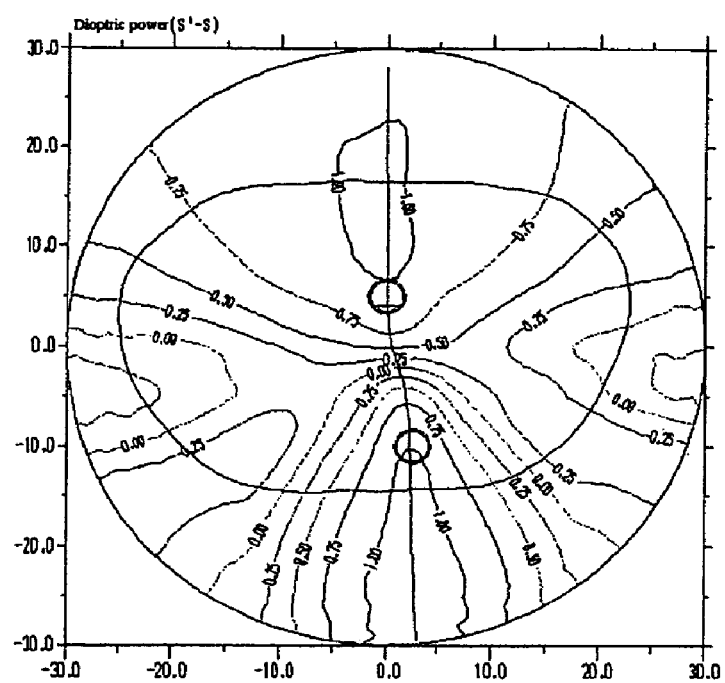
FIGS. 17 to 20 show a further illustrative embodiment according to the invention.
Figure 18:
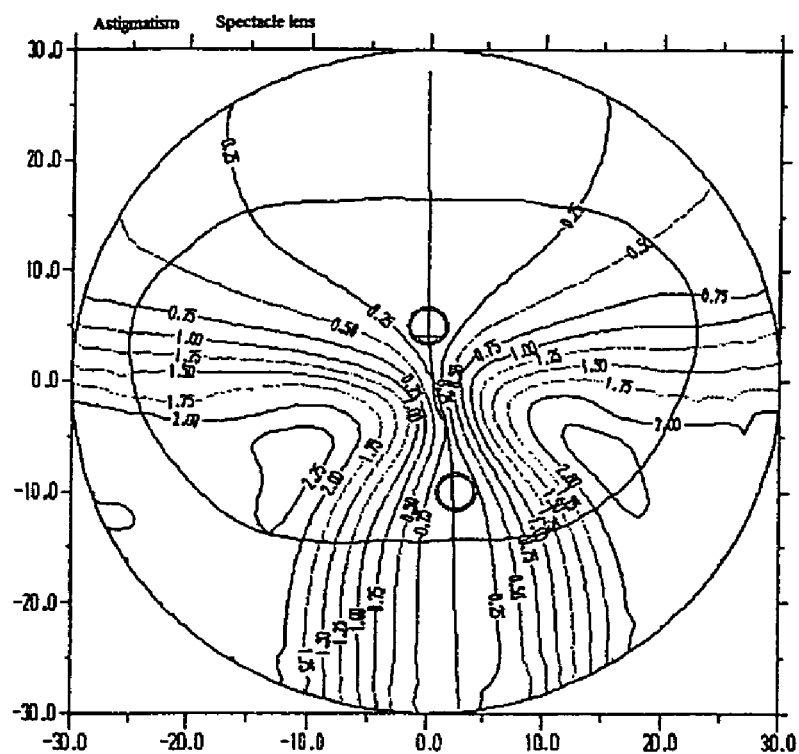
Figure 19:
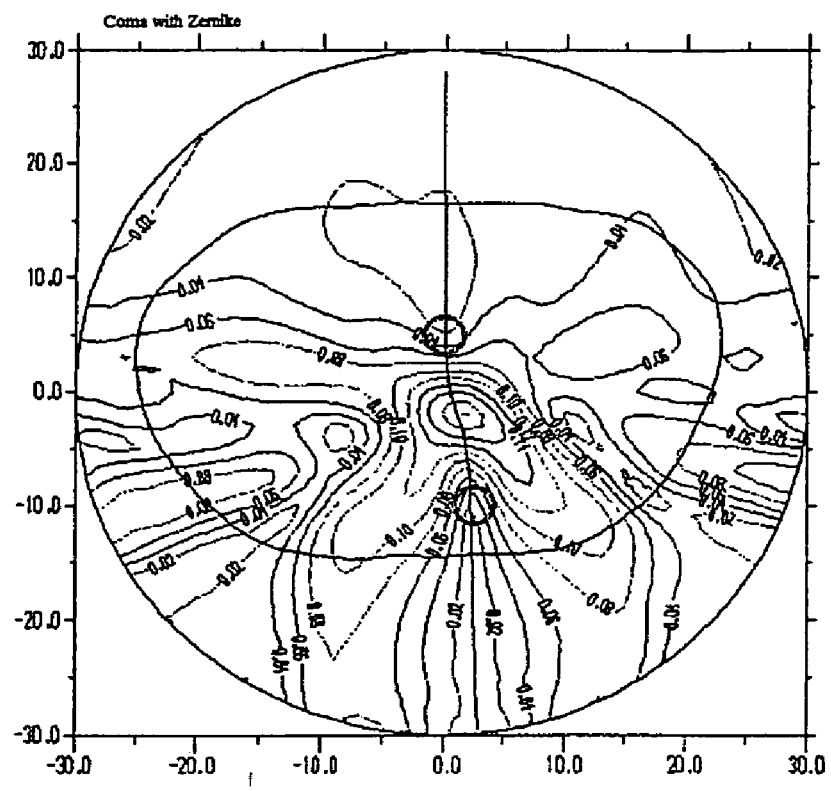
Figure 20:
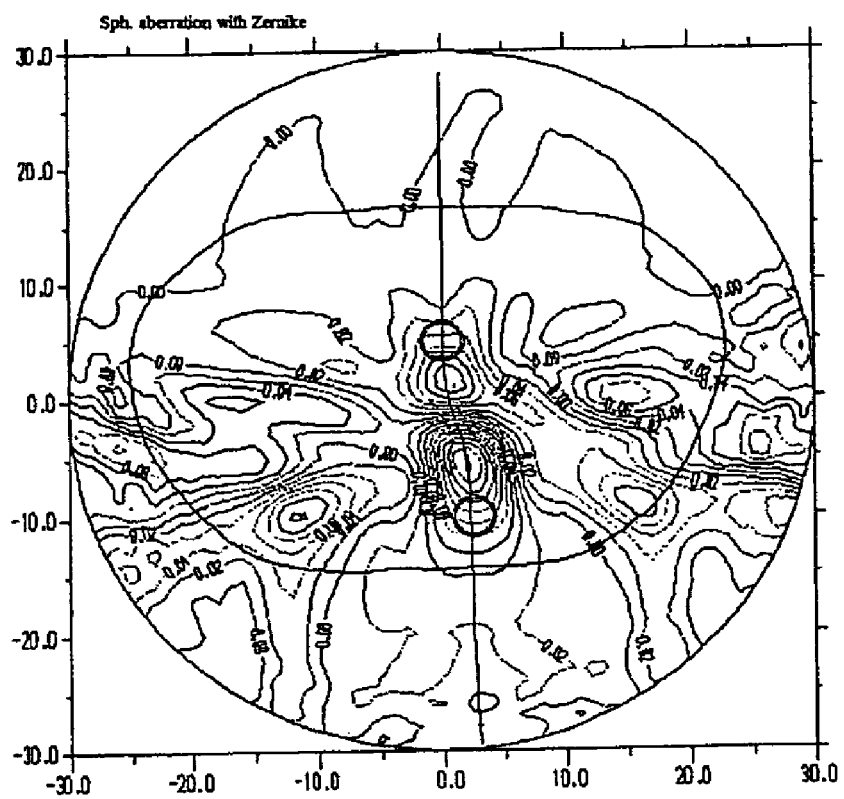

In the case of the prior art in FIG. 16, both the maximum value and the minimum value are located outside this rectangle, specifically both the nasal and temporal minimum values at Y=0, and the maximum values at Y=−8. These values are also substantially greater than in the case of the invention.

Since, in the invention, the spherical aberration is also produced only by the progression, it is advantageous that the quotient of spherical aberration and addition is bounded.

|  | Addition | | |
| --- | --- | --- | --- |
|  | 1 | 2 | 3 |
| Minimum spherical aberration | −0.05 | −0.13 | −0.16 |
| Maximum spherical aberration | 0.06 | 0.11 | 0.12 |

The spherical aberration also increases with the increase in pupil diameter. However, particularly in the case of progressive lenses with a short progression, it is preferred when this is bounded.

Figure 10:
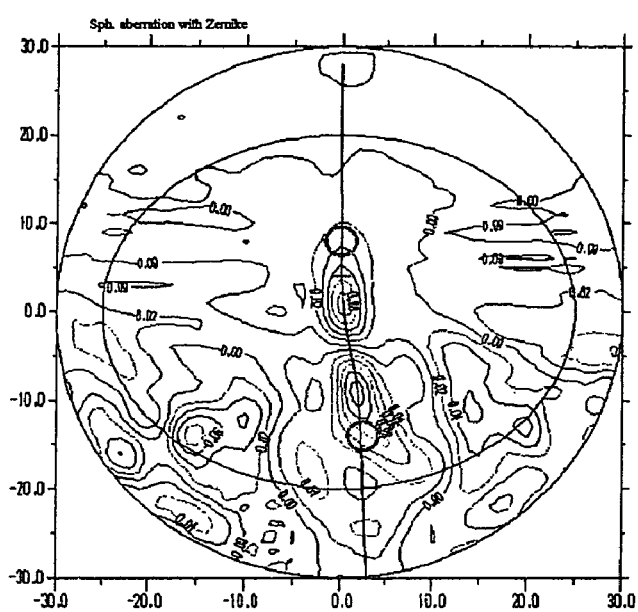
FIG. 10 shows the variation in the spherical aberration as a function of the pupil diameter.
Figure 11:
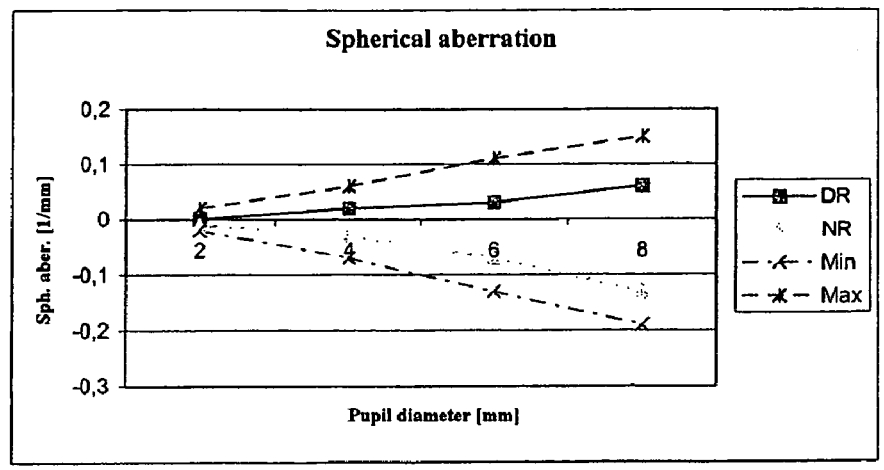
FIG. 11 shows the variation in the spherical aberration as a function of the pupil diameter.

FIG. 10 illustrates the variation in the spherical aberration as a function of the pupil diameter. The dashed line with crosses illustrates the variation in the maximum value. The dashed and dotted line with crosses illustrates the variation in the minimum value. The continuous line with squares illustrates the variation in the distance reference point, and the dotted line with triangles illustrates the variation in the near reference point. It can be seen that the gradient (in terms of absolute value) is smaller at the reference points than at the maximum values.

Figure 13:
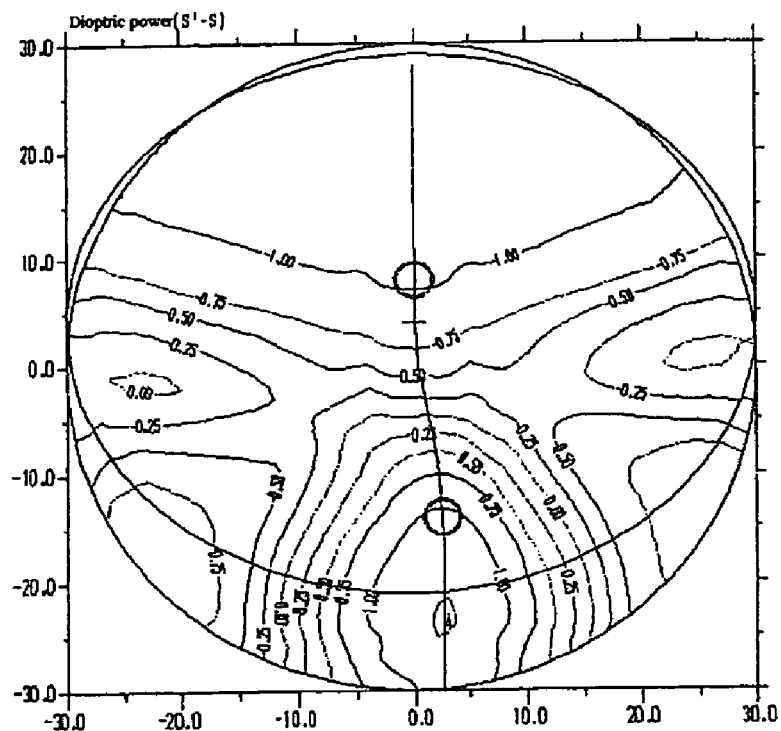
FIGS. 13 and 14 show the dioptric power and the astigmatism of a progressive lens according to the prior art.
Figure 14:
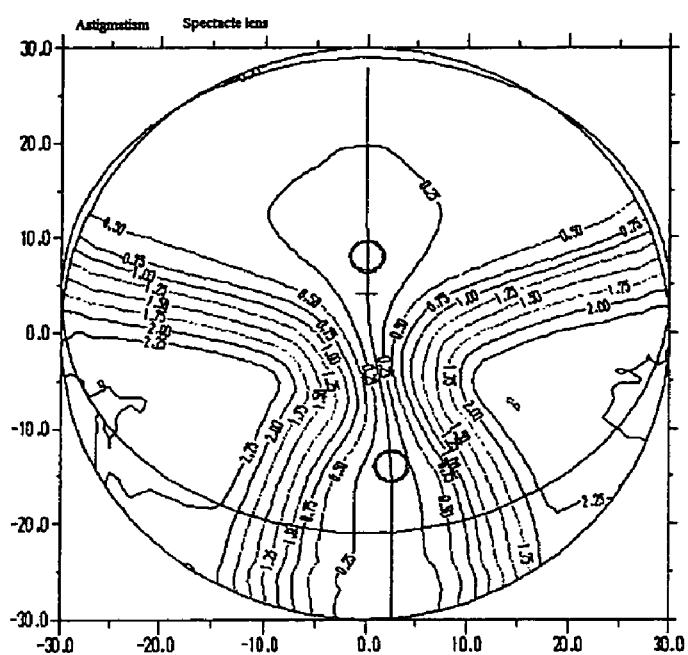

FIGS. 13 and 14 illustrate the dioptric power and the astigmatism (in the position of use in each case) of a progressive lens according to the prior art. The spectacle lens has the values sph −1.0 add 2.0 n=1.596. This lens is a Progressiv life 2 lens from Rodenstock. The coma and the spherical aberration of this progressive lens are illustrated in FIGS. 15 and 16.

A further illustrative embodiment according to the invention is illustrated in FIGS. 17 to 20. This spectacle lens also has the values sph −1.0 add 2.0 n=1.596, but the progression length is now substantially shorter here. Consequently, of course, there is a rise in the maximum value of the coma and in the maximum and minimum values of the spherical aberration. Nevertheless, it is also ensured here that the extreme values lie in the progression channel, and therefore in the rectangle described above. It therefore follows that no additional aberrations are introduced here, either.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A unifocal spectacle lens having an aspheric or atoric surface, wherein said lens exhibits a small spherical aberration of less than 0.1/mm at a distance r up to 30 mm from the vertex of the lens.

2. A unifocal spectacle lens having an aspheric or atoric surface, wherein said lens exhibits a small coma of less than 0.2/mm at a distance r up to 30 mm from the vertex of the lens.

3. A progressive spectacle lens having higher order aberrations comprising a coma, wherein the ratio of coma and addition is limited such that at an addition of 1, the maximum coma is 0.08; at an addition of 2, the maximum coma is 0.14; and at an addition of 3, the maximum coma is 0.18.

4. A progressive spectacle lens according to claim 3, wherein the maximum value of the coma is located in a rectangle that is bounded vertically at the top by the centering point and at the bottom by the near reference point, and horizontally on one side by a vertical straight line that goes through the centering point and distance reference point, and on the other side by a vertical straight line that goes through the near reference point of the lens.

5. A progressive lens according to claim 3, wherein as a function of the pupil diameter, the coma has a smaller gradient at the prism reference point and the near reference point than at the point of maximum coma.

6. A progressive spectacle lens having higher order aberrations comprising a spherical aberration, wherein the ratio of spherical aberration and addition is limited such that at an addition of 1, the spherical aberration is between −0.05 and 0.06; at an addition of 2, the spherical aberration is between −0.13 and 0.11; and at an addition of 3, the spherical aberration is between −0.16 and 0.12.

7. A progressive spectacle lens according to claim 6, wherein both the maximum value and the minimum value of the spherical aberration are located in a rectangle that is bounded vertically at the top by the centering point and at the bottom by the near reference point, and horizontally on one side by a vertical straight line that goes through the centering point and distance reference point, and on the other side by a vertical straight line that goes through the near reference point.

* * * * *